(No Model.)

A. S. BOWER & T. THORP.
REGENERATIVE GAS BURNER.

No. 322,038. Patented July 14, 1885.

Witnesses
W. R. Haight
W. O'Beirne

Inventors
Anthony S. Bower
and
Thomas Thorp
by W. H. Babcock
Attorney (No Model.) 3 Sheets—Sheet 2.

A. S. BOWER & T. THORP.
REGENERATIVE GAS BURNER.

No. 322,038. Patented July 14, 1885.

Witnesses:
W. R. Haight
W. O'Beirne

Inventors
Anthony S. Bower
and
Thomas Thorp
by W. H. Babcock
Attorney.

(No Model.) 3 Sheets—Sheet 3.

A. S. BOWER & T. THORP.
REGENERATIVE GAS BURNER.

No. 322,038. Patented July 14, 1885.

Witnesses
W. C. Haight
W. O'Beirne

Inventors
Anthony S. Bower
and
Thomas Thorp
by W. H. Babcock
Attorney

UNITED STATES PATENT OFFICE.

ANTHONY SPENCER BOWER, OF ST. NEOTS, COUNTY OF HUNTINGDON, AND THOMAS THORP, OF WHITEFIELD, COUNTY OF LANCASTER, ENGLAND.

REGENERATIVE GAS-BURNER.

SPECIFICATION forming part of Letters Patent No. 322,038, dated July 14, 1885.

Application filed February 6, 1884. (No model.) Patented in England July 31, 1883, No. 3,742.

*To all whom it may concern:*

Be it known that we, ANTHONY SPENCER BOWER, engineer, residing at St. Neots, in the county of Huntingdon, England, and THOMAS THORP, architect, residing at Whitefield, in the county of Lancaster, England, both subjects of the Queen of Great Britain, have invented a new and useful Regenerative Gas-Lighting Apparatus, (for which we have obtained a patent in Great Britain, No. 3,742, bearing date July 31, 1883,) of which the following is a specification.

Our invention relates to improvements in regenerative gas-lighting apparatus; and the object of our improvements is to increase the amount of light obtained from the combustion of gas. We attain this object by the mechanism illustrated in the accompanying three sheets of drawings, in which—

Figure 1:
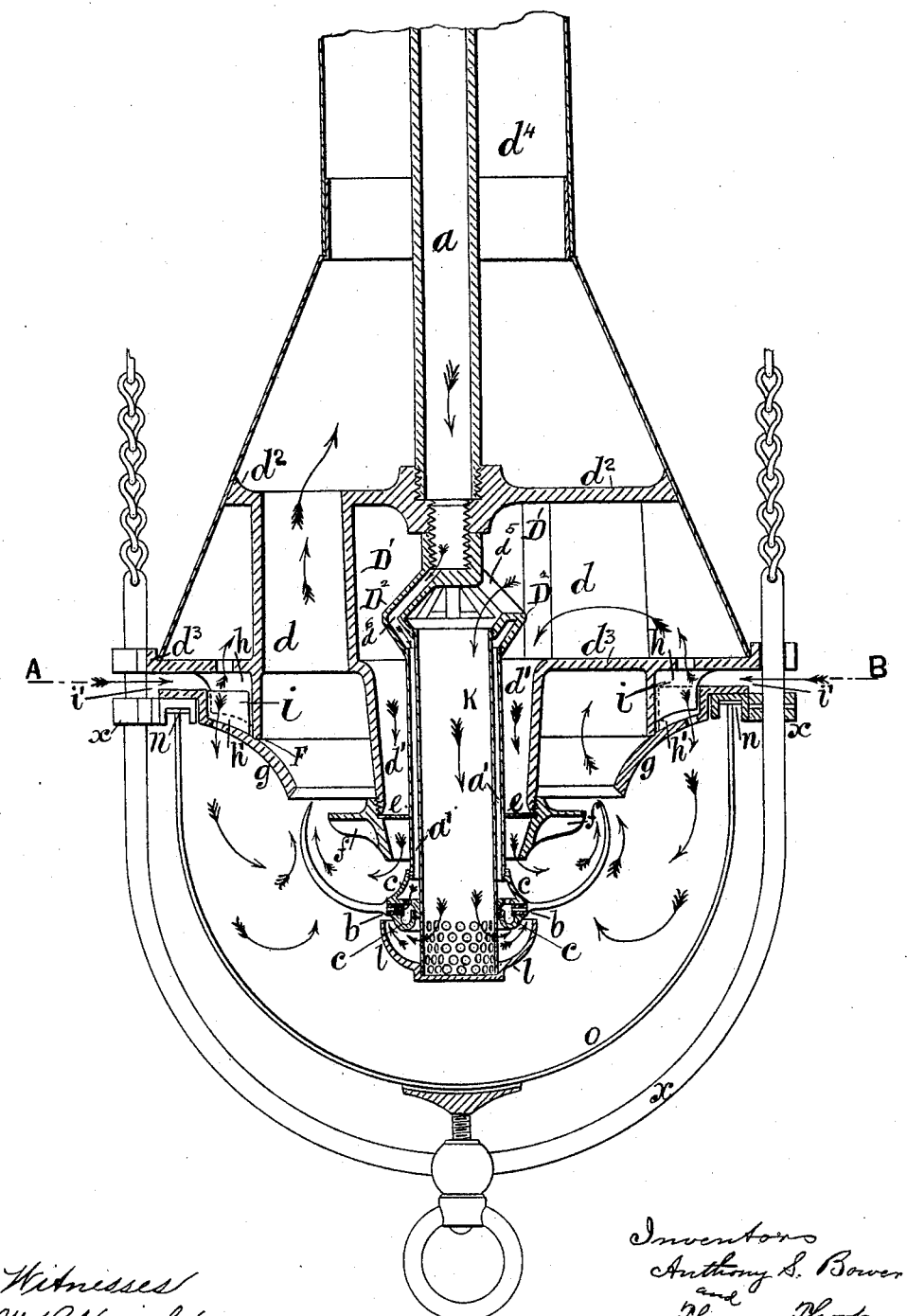
Figure 2:
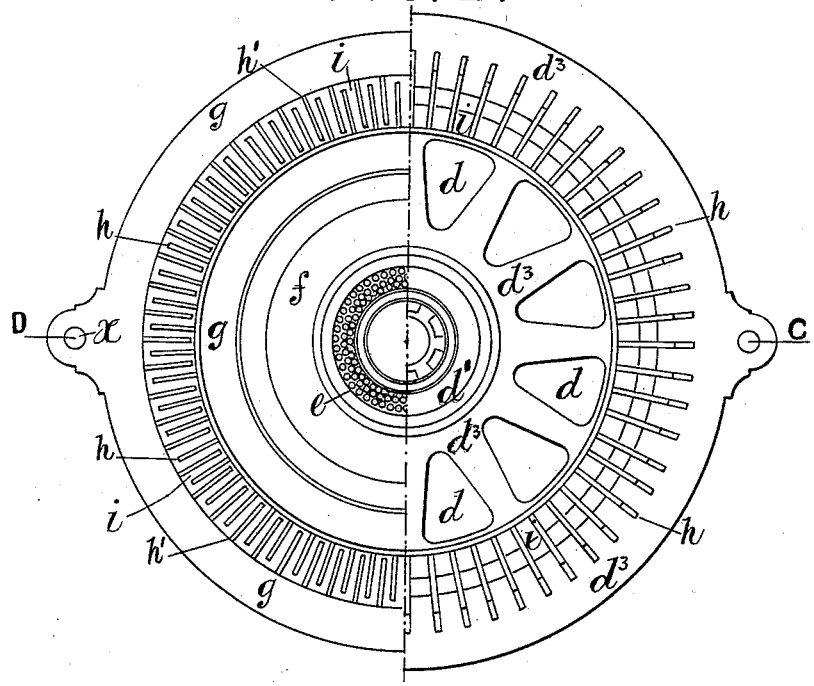
Figure 3:
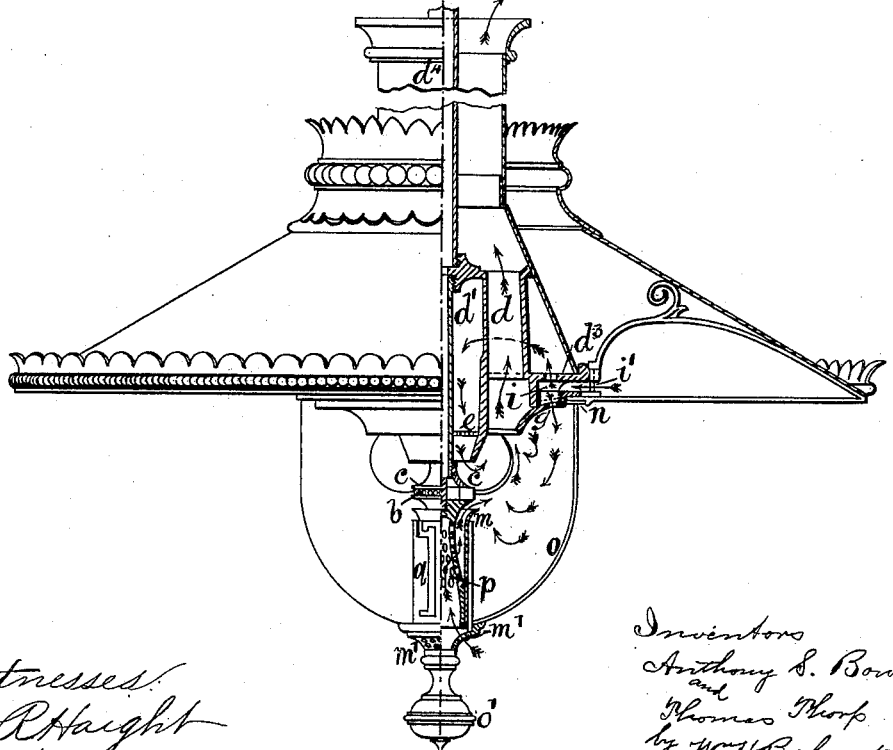
Figure 4:
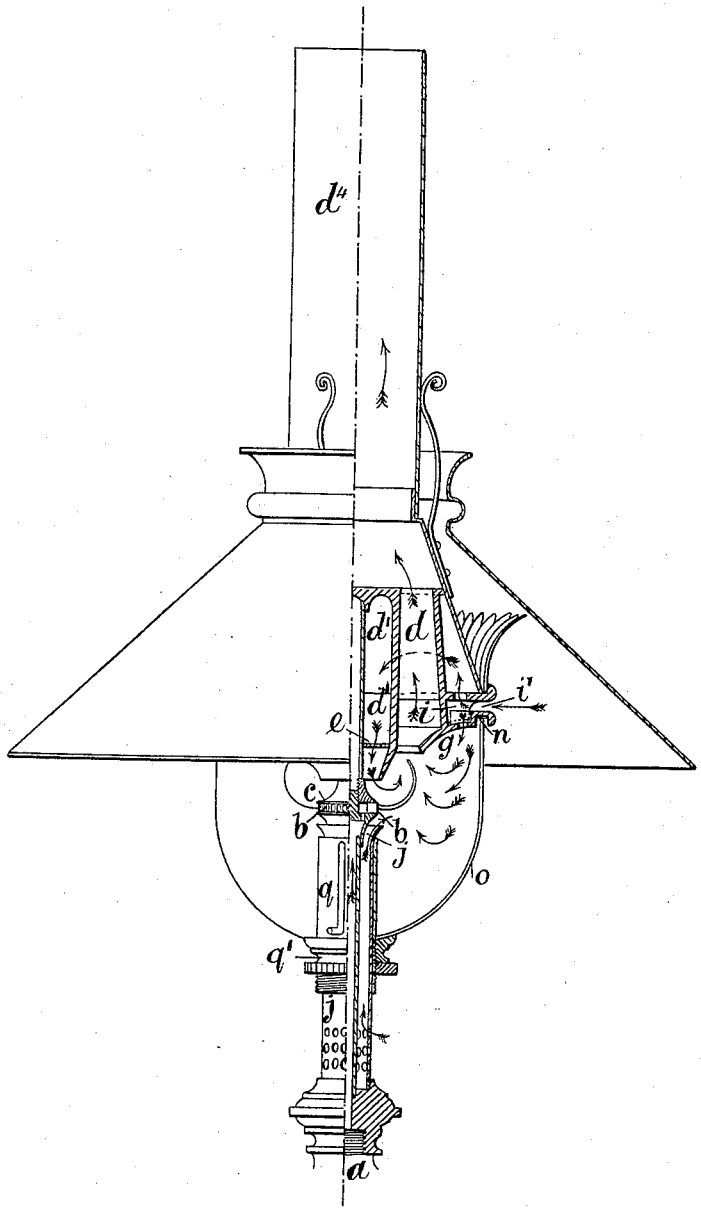

Figure 1 is an elevation, partly in section, and Fig. 2 is a plan, the part C looking upward and the part D looking downward, on the line A B, Fig. 1, of our improved suspended lamp or regenerative gas-lighting apparatus, the gas being supplied from above. Fig. 3 is an elevation, partly in section, of another form of suspended lamp, in which the gas is also supplied from above; and Fig. 4 is a similar view of a lamp for table use or for other purposes, the gas being supplied from below.

Similar letters refer to similar parts throughout the several views.

In Figs. 1 and 2, $a$ is the central gas-supply pipe, to the lower part of which is secured a larger pipe or tube, $a'$, communicating with the interior of a ring-shaped burner, $b$, with holes in its periphery for the outlet of gas. The burner $b$, which is a perforated ring of steatite or other suitable material, or, as shown in the drawings, the portion required to be perforated and from which the gas issues, may be of steatite or other suitable non-conducting material, secured between two flanges, $c$, the upper flange being secured to the bottom of the pipe or tube $a'$, and the lower flange being screwed upon the lower part of said upper flange, as shown in Fig. 1.

Around the gas-supply pipe and above the burner $b$ is fixed a primary regenerator or heating-chamber, D', made up of vertical passages or tubes $d$, formed with or secured to metal plates $d^2 d^3$, through which the products of combustion pass on their way to the chimney $d^4$.

From the lower plate, $d^3$, a tapering tube, $d'$, extends downward around the pipe $a'$, leaving an intermediate annular space between them. The bottom of this space is provided with a perforated plate, $e$, which is held in place by a shoulder on a disk, $f$, said disk being screwed on the lower end of tube $d'$. An annular flange, F, extends downward from said plate $d^3$ to deflector $g$, said flange being concentric with said tube $d'$ and exterior thereto. The space between said flange and tube allows the passage of the products of combustion to the tubes $d$. The annular space exterior to said flange forms the secondary regenerator or heating-chamber $i$, hereinafter described, which communicates with the primary regenerator through plate $d^3$.

Against the lower part, $d^3$, of the primary regenerator, near the outer edge, is arranged a perforated annular curved plate, $g$, which deflects the flame and products of combustion inward. Between this deflector $g$ and the lower plate, $d^3$, near their outer edges are a number of projections or plates, $h\ h'$. The plates $h$ are attached to plate $d^3$, and the plates $h'$ to the deflector $g$, as shown in Figs. 1 and 2. The plates $h$ and $h'$ are contained in a chamber, $i$, formed between the bottom plate, $d^3$, and the deflector $g$, open to the upper part of the primary regenerator D' and to the atmosphere at $i'$. We name this chamber $i$ the "secondary regenerator."

An air-supply tube, $k$, perforated at the lower end, is fitted inside the gas-supply pipe $a'$ and secured to a perforated boss at the bottom of the gas-supply pipe $a$. The tube $k$ is open at the upper end to and conducts air from the primary regenerator D' to the under side of the burner $b$, where a deflector, $l$, is placed, to cause the air to impinge upon the issuing gas. The upper ends of the pipes $k$ and $a'$ are attached to a double-wall casting or drum, $D^2$, which has a space or passage, $d^6$, between the walls, for making communication between gas-pipes $a$ and $a'$. On one side said drum is also provided with an opening through both walls for allowing the influx of air from heating-chamber D' to pipe k. This casting is formed with or secured to plate d² aforesaid.

The globe o is supported by the globe-holder x, which is provided with supporting blocks or lugs, that bear against the deflector g. The globe o bears against a ring of asbestus, n, or other refractory yielding material, secured in the globe-holder x.

Fig. 3 shows a modified form of suspended lamp, in which we use a pipe or tube, m, secured to a tube, p, which may form the lower flange of or be secured to the burner b. The tube m terminates in a bell-mouth at the end below the burner. The tube p is perforated and open below to the atmosphere through spaces m' in the handle o' of the globe o. The globe o and handle o' are held in their place by a tube, q, which surrounds the tube m and is secured to it by a bayonet or other joint. The rim or upper edge of the globe o bears against a loose ring, n, of any suitable material, fitted to the outer edge of the deflector g.

Fig. 4 shows a lamp for table use or for other purposes, in which the gas is supplied from below through the tube a; and instead of employing either the tube k or the tube p to conduct air to the burner b, we use a tube, j, secured below the burner to and around the pipe a. This tube j has perforations at its lower end communicating with the atmosphere, and ends in a bell-mouth near and below the burner b. The flame is inclosed in a globe, o, which rests in a holder, q', screwed on the tube q, which surrounds the tube j and is secured to it by a bayonet or other joint.

Before lighting the gas we lower the globe o, and when the gas is burning the products of combustion pass through the tubes of the primary regenerator D into the chimney d⁴, as indicated by the arrows on the drawings, and cause the air for combustion to pass from the outside at i' through the secondary regenerator or heating-chamber i, between the regenerator-tubes d, as indicated by the arrows, and down the central tube, d', in a highly-heated state, to the inside of the flame. The outer or under side of the flame is supplied with air, also in a highly-heated state, from the secondary regenerator i directly into the globe o, and also with air either from above through i', between the tubes d of the primary regenerator, and down and out through the perforations in the tube k, (see Fig. 1,) or from below through the spaces in the handle o', perforations in the tube p, and out of the bell-mouth at the end of the tube m, (see Fig. 3,) or through the perforations in the tube j and out at the bell-mouth beneath the burner. (See Fig. 4.)

The secondary regenerator i heats that portion of the air admitted directly to the globe o, and also partially heats the whole of the air supplied through the primary regenerator D for combustion with the gas.

We are aware that it is not new to provide a lamp with a heating-chamber or regenerator through which pass tubes for the outlet of the products of combustion, said chamber being connected with a second heating chamber or space of similar situation to the space within tube d'. We are also aware that it is not broadly new to supply air and gas to a burner through passages which are concentric with one another. We therefore do not broadly claim these constructions; but, Having stated the nature of our invention and described the manner of performing the same, we declare that what we claim, and desire to secure by Letters Patent of the United States, is—

1. In a regenerative gas-burner, the combination of the air-pipe and gas-pipe, arranged the one within the other, with the burner, a regenerator or heating-chamber, D', which surrounds said pipes, a secondary regenerator or heating-chamber, i, which communicates with said chamber D', and an outlet-passage for the products of combustion, which consists of a part in contact with said secondary heating-chamber i, and of tubes d extending up through said heating-chamber D', substantially as set forth.

2. The air-supply pipe k and the surrounding gas-supply pipe a', in combination with a burner at the lower ends of said pipes, and a drum to which the upper ends of said pipes are secured, and which is provided with a passage for the inlet of gas and an opening for the inlet of air, substantially as set forth.

3. A burner consisting of a perforated refractory ring held in place by two circular plates, c, one of which is screwed on the other, substantially as set forth.

4. A heating-chamber, D', having tubes d extending up through it for the passage of products of combustion, in combination with a gas-tube and an air-tube which pass down through said heating-chamber, a tube, d', forming a downward extension of said chamber around pipe a', and a supplemental heating-chamber, i, below said chamber D' and exterior to said tube d', substantially as set forth.

5. A heating-chamber or regenerator, i, provided with internal projections or plates, h h', in combination with the burner whereby said chamber is heated, devices which supply air to said heating-chamber, and passages conducting the same from said chamber to said burner, substantially as set forth.

The foregoing specification of our improved regenerative gas-lighting apparatus signed by us this 21st day of January, 1884.

ANTHONY SPENCER BOWER.
THOMAS THORP.

Witnesses:
MARK SHAW,
 Of 86 Raleigh Street, Nottingham, Law Clerk.
W. H. WARSOP,
 Of 28 Ilkeston Road, Nottingham, Law Clerk.